United States Patent [19]  [11] 4,165,239
Linden et al.  [45] Aug. 21, 1979

[54] PROCESS FOR DISPERSING PIGMENTS AND FILLERS USING CARBOXYLIC ACID ESTERS OF TERTIARY ALKYLOLAMINES

[75] Inventors: Heinrich Linden; Hans Bornmann, both of Düsseldorf, Fed. Rep. of Germany

[73] Assignee: Henkel Kommanditgesellschaft auf Aktien, Düsseldorf-Holthausen, Fed. Rep. of Germany

[21] Appl. No.: 916,924

[22] Filed: Jun. 19, 1978

[30] Foreign Application Priority Data

Jun. 23, 1977 [DE] Fed. Rep. of Germany ....... 2728237

[51] Int. Cl.$^2$ .......................... C09C 1/24; C09C 1/36; C09C 3/08
[52] U.S. Cl. ............................... 106/300; 106/288 B; 106/304; 106/308 Q; 106/308 F; 106/308 N; 106/309
[58] Field of Search ............... 106/308 N, 308 F, 300, 106/288 B, 304, 309, 308 Q, 289, 290, 301, 302, 292, 293, 294, 295, 296, 299

[56] References Cited

U.S. PATENT DOCUMENTS

| | | | |
|---|---|---|---|
| Re. 21,530 | 8/1940 | Kritchevsky | 260/404 |
| 1,848,213 | 3/1932 | Wiegand | 106/308 N |
| 2,022,678 | 12/1935 | Kritchevsky et al. | 106/289 |
| 2,305,379 | 12/1942 | Detrick et al. | 106/308 N |
| 2,680,725 | 6/1954 | DiBattista | 106/299 |
| 3,617,323 | 11/1971 | Riegler | 106/300 |
| 3,840,382 | 10/1974 | Burke | 106/288 B |
| 3,905,936 | 9/1975 | Hawthorne | 106/300 |

FOREIGN PATENT DOCUMENTS 285307 12/1965 Australia ................................. 106/300

*Primary Examiner*—Helen M. McCarthy
*Attorney, Agent, or Firm*—Hammond & Littell

[57] ABSTRACT

A process for improving the dispersibility of inorganic pigments and fillers which comprises contacting said pigments and fillers with esters of aliphatic carboxylic acids having 4 to 22 carbon atoms with tertiary alkylolamines, and recovering a highly dispersible pigment or filler.

10 Claims, No Drawings

PROCESS FOR DISPERSING PIGMENTS AND FILLERS USING CARBOXYLIC ACID ESTERS OF TERTIARY ALKYLOLAMINES

FIELD OF THE INVENTION

The present invention relates to the use of carboxylic acid esters of tertiary alkylolamines for the treatment of inorganic pigments and fillers in order to improve the dispersibility of the inorganic pigments and fillers.

BACKGROUND OF THE INVENTION

The dispersing of pigments and fillers in organic and aqueous media, that is, the destruction of the agglomerates formed from the primary pigment and filler particles, is a work operation required in the production of paints and other pigmented coating agents, which constitutes a considerable cost factor owing to the necessary expenditure of time and energy. This dispersing operation is performed mechanically by means of various machines such as kneaders, cylinder mills and ball mills. In order to shorten this working operation, the pigments or fillers are treated with organic compounds which are intended to decrease the interfacial tension between the pigment or filler granule and the organic or aqueous medium and thus facilitate the dispersion of the pigment or filler. As far as possible, the action of these organic compounds should be limited only to improving dispersibility without attendant negative phenomena.

It is already known from U.S. Pat. No. 1,722,174 to treat inorganic pigments and fillers with stearic acid and resinic acid and ammonium soaps thereof in order to improve the ability of the pigments and fillers to disperse. According to data presented in French Patent Specification No. 1,276,739, (U.S. Pat. No. 3,015,573) triethanolamine or salts thereof serve the same purpose. Furthermore, aliphatic amines have already been proposed as agents for improving the dispersing effect. When choosing the agents to be used, it has to be borne in mind that many additives are products which are not compatible with lacquer and which, in addition to the desired dispersing effect, also have many undesirable properties such as water-solubility and emulsifying power. Many of them also lead to attendant negative phenomena such as loss of luster of the finished coating and delayed drying during formation of the films.

OBJECTS OF THE INVENTION

An object of the present invention is the development of a process for the production of highly dispersible inorganic pigments and fillers.

Another object of the invention is the development of a process for the production of highly dispersible inorganic pigments and fillers which comprises contacting said inorganic pigments and fillers with esters of aliphatic carboxylic acids having 4 to 22 carbon atoms with tertiary alkylolamines, and recovering highly dispersible pigments and fillers.

These and other objects of the invention will become more apparent as the description thereof proceeds.

DESCRIPTION OF THE INVENTION

According to the present invention there is provided a method for producing highly dispersed inorganic pigments and fillers, which comprises contacting said pigments and fillers with esters of aliphatic carboxylic acids having 4 to 22 carbon atoms with tertiary alkylolamines. These esters can be advantageously used for the treatment of inorganic pigments and fillers, in order to bring about an excellent improvement in the dispersibility of the inorganic pigments and fillers in organic and aqueous media. Both the full and partial esters can be used in accordance with the present invention. Preferred dispersing agents are the fully esterified products.

More particularly, the present invention relates to a method for producing a highly dispersed inorganic pigment or filler, which comprises contacting said inorganic pigment or filler with at least one ester of an aliphatic carboxylic acid having 4 to 22 carbon atoms with a tertiary alkylolamine, and recovering a highly dispersed pigment or filler.

The esters to be used in accordance with the present invention can be produced in a generally known manner by heating the acids with the alkylolamines in the desired molar ratios, with separation of the water of reaction formed.

Saturated and unsaturated, straight chain and branched chain aliphatic carboxylic acids having 4 to 22 carbon atoms in the molecule, which optionally can be substituted by hydroxyl groups, serve as the acid component for producing the esters. Preferred are the aliphatic carboxylic acids having 6 to 18 carbon atoms in the molecule. The acid component of the esters of the invention thus includes alkanoic and alkenoic acids, as well as hydroxy-substituted alkanoic and alkenoic acids. Suitable hydroxy-substituted acids are the monohydroxy alkanoic and alkenoic acids, like hydroxy stearic acid and ricinoleic acid. The acid component of the esters of the invention does not have to be a single acid. On the contrary, the same satisfactory results can be obtained by using esters whose acid component constitutes a mixture of various acids of the above-described type. Examples of aliphatic carboxylic acids which are useful as the acid component of the esters to be used in accordance with the present invention are, in particular, caproic acid, 2-ethylhexanoic acid, lauric acid, myristic acid, palmitic acid, stearic acid, oleic acid, ricinoleic acid, ricinenic acid, hydroxystearic acid, coconut fatty acids, soya oil fatty acids and preliminary fatty acids of $C_8$–$C_{10}$ chain length produced during the distillation of coconut fatty acids.

Tertiary alkylolamines, such as dimethylethanolamine, diethylethanolamine, di-i-propylethanolamine, methyldiethanolamine, ethyldiethanolamine, butyldiethanolamine, triethanolamine, and triisopropanolamine, can serve as the alcohol component for producing the esters to be used in accordance with the present invention. Preferred among the tertiary alkylolamines is triethanolamine.

Tertiary alkylolamines, which are useful as the alcohol component of the esters of the invention, include compounds of the formula

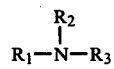

wherein $R_1$ is alkyl of 1 to 8, preferably 1 to 4, carbon atoms or hydroxyalkyl of 2 to 4, preferably 2, carbon atoms; $R_2$ is alkyl of 1 to 8, preferably 1 to 4, carbon atoms or hydroxyalkyl of 2 to 4, preferably 2, carbon atoms; and $R_3$ is hydroxyalkyl of 2 to 4, preferably 2, carbon atoms.

Esters of aliphatic carboxylic acids with tertiary alkylolamines to be used in accordance with the present invention are, for example, triethanolamine-tri-caproic acid ester, triethanolamine-tri-2-ethylhexanoic acid ester, triethanolamine-tri-lauric acid ester, triethanolamine-tri-oleic acid ester, triethanolamine-tri-hydroxystearic acid ester, triethanolamine-tri-coconut fatty acid ester, triethanolamine-tri-soya oil fatty acid ester, triethanolamine-tri-$C_{8-10}$- preliminary fatty acid ester, methyldiethanolamine-di-butyric acid ester, dimethylethanolamine-valeric acid ester, diethanolamine-dimyristic acid ester, di-i-propylethanolamine palmitic acid ester, ethyldiethanolamine-di-ricinoleic acid ester, triethanolamine-di-ricinenic acid ester, triisopropanolamine-tri-arachic acid ester, triethanolamine-di-caproic acid ester, and triethanolamine-mono-2-ethylhexanoic acid ester.

In the present treatment of the inorganic pigments and fillers to improve their dispersibility in organic and aqueous media, the esters of aliphatic carboxylic acids having 4 to 22 carbon atoms and tertiary alkylolamines are used in quantities of 0.05 to 4 percent by weight, preferably 0.1 to 1.0 percent by weight, relative to the weight of the pigment or filler to be coated in the process. This quantity of ester is also the quantity which is applied to the pigment or the filler by virtue of the performance of the coating process of the present invention.

The coating process of the present invention is generally applicable for the treatment of inorganic pigments and fillers. Most of said pigments and fillers are suitable as substrates to be coated. Examples of pigments to be coated in accordance with the process of the present invention are titanium dioxide, zinc sulfide, lithopone, zinc oxide, cadmium sulfoselenide, iron oxide, chrometin, cadmium mercury, chromium oxide, zinc chromate, cadmium sulfide, etc. Examples of fillers to be coated in accordance with the process of the present invention are calcium carbonate, aluminum oxide, aluminum, calcium silicate, barium sulfate, diatromaceous earth, carbon black, beryllium oxide, barium ferrite, etc. Particularly good results are obtained when titanium dioxide pigments are treated in accordance with the present invention. Coating can be effected in a variety of ways. For example, coating can be effected during the course of production of the pigment, such as during the grinding process where the liquid pigment suspension is subjected to the action of ball mills, pinned disc mills, or steam-jet mills, by treating the damp pigment filter cake, and also by treating the finished product pigment or filler.

It is, therefore, irrelevant whether the pigments have already been subjected to inorganic after-treatment, as is frequently the case with, for example, titanium dioxide, which has been after-treated by precipitation of aluminum oxide and/or silicon dioxide.

In the process of the present invention, for the treatment of inorganic pigments and fillers, the esters of aliphatic carboxylic acids and tertiary alkylolamines can be used directly as such, as aqueous suspensions, or possibly with the joint use of suitable surfactants, or as solutions in organic solvents such as benzine. When surfactants are jointly used to produce the aqueous suspensions of the esters to be used in accordance with the present invention, special care has to be taken that the surfactants used do not have any detrimental effects on the properties of the coating agents and the films produced therewith. The aqueous suspension or organic solvent solution employed in the coating process of the invention can advantageously contain approximately 1.5 to 3 parts by weight of water or organic solvent, respectively, to one part by weight of pigment or filler to be treated. The coating step is suitably conducted at a temperature between about 20° and 40° C., very advantageously at room temperature. The pigments or fillers are contacted with the esters used in accordance with the present invention for a time sufficient to ensure good coating and subsequent improved dispersibility. The treatment time required in any given case can be readily determined through routine experimentation. The coating operation can advantageously be performed, for example, by agitation together of the pigment or filler to be coated and a solution or aqueous suspension of an ester of the invention for a period of about ¼ hour to 2 hours.

The present invention will now be further illustrated by way of the following examples and comparative experiments, without, however, it being limited thereto.

EXAMPLE 1

A titanium dioxide of the rutile type (commercial product "Bayertitan R-U-2"), produced by the sulfate method and inorganically after-treated by precipitation of aluminum oxide, was used as the pigment to be coated. Triethanolamine tricaproic acid ester, produced in the following manner, was used for the organic coating.

149 gm of triethanolamine (1 mole) and 348 gm of caproic acid (3 moles) were heated to temperatures of from 140 to 200° C. in an agitating flask with the addition of a small quantity of toluene acting as an entrainer and with the use of a separator for removal of the water. 52 ml (theory=54 ml) of water from the esterification reaction had been separated after 8 hours. The acid number was 10.4. The crude ester was distilled after the toluene had been driven off. The main distillation run amounted to 86.5% of theory and had the following characteristic values:

Boiling point: 192°–195° C. at 0.2 mm Hg
% N according to Kjeldahl: 3.27 (calculated 3.13)
% tert. N: 3.23 (calculated 3.13)
Acid No: 0.5
Color: Light yellow oil Coating was effected with solutions of triethanolamine-tricaproic acid ester in light benzine having a boiling point of 60° to 95° C.

100 gm of titanium dioxide were intensively agitated with 250 ml of a light benzine solution containing the ester for ½ hour, and the benzine was subsequently distilled off at approximately 100° C. under application of a vacuum (water jet pump).

Three tests (a–c) were carried out in accordance with the coating procedure described in the immediately preceding paragraph, with the following quantities used in the tests:

(a) 0.2 gm of triethanolamine-tricaproic acid ester in 250 ml of light benzine,
(b) 0.4 gm of triethanolamine-tricaproic acid ester in 250 ml of light benzine,
(c) 0.8 gm of triethanolamine-tricaproic acid ester in 250 ml of light benzine.

The pigments coated according to the above-described procedure were tested in the following manner. For the purpose of comparison, the non-treated pigment was included as test (d) in the experiments.

Dispersions of each of pigments (a) and (d) were prepared. The dispersion was made up by agitation for a period of 60 minutes of the following dispersing mixtures shown in Table 1 in a mechanical shaker (so-called "Paint Conditioner", Model 5100, manufactured by the firm Red Devil/U.S.A.) in 250 ml wide-necked flasks charged with 75 gm of glass beads having a diameter of 3 mm.

TABLE 1

| Dispersing preparation or lacquer | a | b | c | d |
|---|---|---|---|---|
| Titanium dioxide | 18.036 gm | 18.072 gm | 18.144 gm | 18.00 gm |
| Quantity of coating substance in %, relative to pigment | 0.2 | 0.4 | 0.8 | None |
| Air-drying alkyd resin with 48% oil, 55% in xylene - test benzine (= commercial product Alkydal F 48 manufactured by the firm Bayer) | 24.0 gm | 24.0 gm | 24.0 gm | 24.0 gm |
| Test benzine | 10.0 gm | 10.0 gm | 10.0 gm | 10.0 gm |
| Xylene | 1.4 gm | 1.4 gm | 1.4 gm | 1.4 gm |

Each of the preparations of Table 1 was diluted under agitation with 80 gm of the following mixture to form the finished paint.

| | |
|---|---|
| 72 | gm of alkyd resin (as above) |
| 2.0 | gm of test benzine |
| 1.4 | gm of xylene |
| 1.0 | gm of silicon oil (1% in xylene - Type AK 35 manufactured by the firm Wacker) |
| 1.46 | gm of lead octoate (24% Pb) |
| 0.46 | gm of cobalt octoate (6% Co) |
| 0.28 | gm of manganese octoate (6% Mn) |
| 1.4 | gm of methyl ethyl ketoxime (55% in test benzine) |
| 80.0 | gm |

14.2 gm of the following dispersed-out black paste were added to the lacquer thus obtained and the mixture was homogenized.
18 gm of soot (Flammruss 101, Degussa—so-called "Lamp Black")
180 gm of alkyd resin (as above)
60 gm of test benzine
26 gm of xylene The tinted lacquer produced was applied to glass plates by means of a draw straightedge of 100 μm and, after drying, the reflectance value was determined at 420 nm by means of the colorimeter PM Q II manufactured by the firm C. Zeiss. A higher reflectance value is tantamount to a greater brightening capacity which is contingent on improved dispersion of the white pigment. The following reflectance values shown in Table 2 were obtained:

TABLE 2

| Lacquer | Ester in % | Reflectance Value at 420 nm |
|---|---|---|
| a | 0.2 | 29.9 |
| b | 0.4 | 30.1 |
| c | 0.8 | 30.1 |
| d | 0 | 29.4 |

It can be seen from the values obtained that the brightness and thus the dispersion are clearly improved by 0.2% of triethanolamine-tri-caproic acid ester, relative to the titanium dioxide, and are considerably improved by 0.4 and 0.8% of triethanolamine-tri-caproic acid ester, relative to the titanium dioxide.

EXAMPLE 2

An ester was produced from triethanolamine and 2-ethyl-hexanoic acid in the same manner as in Example 1. The triethanolamine-tri-2-ethyl-hexanoic acid ester was obtained in the form of a yellow oil having the following characteristic values:
Acid number: 0.4
% tert. N: 2.7% (theory=2.66%)
Boiling range: 204° to 215° C. at 0.1 mm Hg Titanium dioxide was coated with 0.5% of this ester in accordance with the method given in Example 1. The coated pigment was tested in accordance with the procedure given in Example 1. The tinted lacquer thus produced had a reflectance value of 30.8 to 420 nm. On the other hand, an identical lacquer produced with a titanium dioxide which had not been coated with the ester, exhibited a reflectance value of only 29.4. The difference of 1.4 between the two values shows the excellent dispersibility of the coated pigment.

EXAMPLE 3

74.5 gm of triethanolamine (0.5 mole) and 423.0 gm of a technical grade soya fatty acid having the acid number 199 (1.5 mole) were heated in an agitating flask for six hours to 150° to 190° C. on a descending cooler, with nitrogen being passed over the reactants. 24 ml of water from the esterification reaction were separated and the acid number was 20. A vacuum of approximately 18 mm Hg was subsequently applied at 180° C. in order to carry out the esterification reaction to as far an extent as possible. The undistilled ester obtained was liquid and of a light brown color. The acid number was 9.2. The tert. N was determined to be 1.5% (theory=1.49).

Titanium dioxide was coated with 0.5% of the triethanolamine-trisoya oil fatty acid ester in accordance with the method given in Example 1. The coated pigment was tested in accordance with the procedure given in Example 1. The tinted lacquer thus produced had a reflectance value of 30.0 at 420 nm, compared with 29.4 in the case of an identical lacquer containing non-coated titanium dioxide.

EXAMPLE 4

49.7 gm of triethanolamine (⅓ mole) and 315.0 gm of technical grade 12-hydroxy stearic acid (acid number=178, hydroxyl number=158) (=1 mole) were esterified in the manner described in Example 3. The ester obtained had a brown color and solidified at approximately 50° C. Titanium dioxide was coated with 0.3% of this triethanolamine-tri-12-hydroxy stearic acid ester in accordance with the method given in Example 1. The coated pigment was tested in accordance with the procedure given in Example 1. The tinted lacquer thus produced had a reflectance value of 30.0 at 420 nm, compared with 29.4 in the case of an identical lacquer containing non-coated titanium dioxide.

EXAMPLE 5

Titanium dioxide of the rutile type was coated with 1% of each of the following products in the manner described in Example 1:
(a) Triethanolamine-tri-2-ethyl-hexanoic acid ester (c.f. Example 2)
(b) Triethanolamine
(c) Soya alkyl-1,3-propylenediamine For the purpose of comparing the influence of the above coated pigments on the drying properties of paint films, these coated pigments were used in an air-drying lacquer of the following composition:

| | |
|---|---|
| 58.0 | parts by weight of alkyd resin having a content of 65% cotton-seed oil, dissolved in 60% test benzine (commercial product Synthalat Cf 61, manufactured by the firm Synthopol Chemie, Buxtehude). |
| 11.6 | parts by weight of test benzine |
| 29.0 | parts by weight of titanium dioxide (a or b or c or without coated pigment, as control experiment) |
| 0.4 | parts by weight of Ca-naphthenate (4% Ca) |
| 0.4 | parts by weight of Co-naphthenate (6% Co) |
| 0.4 | parts by weight of Pb-naphthenate (24% Pb) |
| 0.2 | parts by weight of Methyl-ethyl ketoxime |

The drying behavior was tested by means of a Universal Drying-time Measuring Apparatus (model 338 manufactured by the firm Erichsen, Hemer-Sundwig). This apparatus operates on the following principle:

The paints to be tested are applied to glass plates (350×25×10 mm) by means of a film-drawing device (gap width 200 μm) under identical conditions and are clamped in the measuring apparatus adjacent to one another. A ball-headed pin is introduced into each film sample and is uniformly guided through each film sample over a distance of 24 cm for 24 hours under uniform pressure. Each ball-headed pin leaves a track in the film within the running time, the nature and length of the track being evaluated in the following manner as an indication of the drying behavior:

Distance covered in centimeters by the ball-headed pin from the instant at which it is applied until the commencement of a visible track = duration of the surface drying time in hours Distance covered in centimeters by the ball-headed pin from the instant at which it is applied until the film splits = time for attaining of bone-dryness in hours Distance covered in centimeters by the ball-headed pin from the instant at which it is applied until the termination of the visible track or the end of the cracked film = time for attaining of complete dryness in hours.

Each centimeter of the distance covered corresponds to 1 hour. A comparison test of the drying characteristics of the films resulted in the following values:

TABLE 3

| Lacquer containing TiO₂, coated with 1% of the following products | Time required in hours for | |
|---|---|---|
| | Surface Bone Drying Drying | Complete Drying |
| Triethanolamine-tri-2-ethyl-hexanoic acid ester in accordance with | 1.2    2.6 | 10.7 |
| the invention Triethanolamine | 1.5    5.1 | 18.4 |
| Soya alkyl-1,3-propylenediamine | 1.5    4.0 | 12.2 |
| Control preparation (No coated pigment) | 1.0    2.8 | 12.4 |

The following can be seen from the values given in Table 3:
I: Drying is virtually not delayed by the triethanolamine-tri-2-ethyl-hexanoic acid ester used in accordance with the present invention.
II: Bone-drying and complete drying are considerably delayed by triethanolamine.
III: Bone-drying is clearly delayed by soya alkyl-1,3-propylenediamine.

EXAMPLE 6

149 gm of triethanolamine (1 mole) and 232 gm of caproic acid (2 moles) were heated in an agitating flask to 140° to 190° C. for 12 hours in a descending cooler. 35.5 ml of water from the esterification reaction were separated (theory=36 ml). The triethanolamine-dicaproic acid ester remaining in the flask had the following characteristic values:
Color: Light yellow oil
Acid No: 2.1
% N: 4.15 (calculated 4.06)

Titanium dioxide R was coated with 0.8% of this triethanolamine-di-caproic acid ester in accordance with the method given in Example 1. The coated pigment was tested in accordance with the procedure given in Example 1. The tinted lacquer produced thereby had a reflectance value of 30.1 at 420 nm, compared with 29.0 in the case of an identical lacquer containing non-coated titanium dioxide.

EXAMPLE 7

N-methyl-diethanolamine-di-oleic acid ester was produced in accordance with the method of Example 3 from 60.4 gm (0.5 mole) of N-methyl-diethanolamine and 275 gm (1 mole) of a technical grade oleic acid (acid number 204, iodine number 92). The product obtained had the following characteristic values:
Color: Light yellow oil
Acid No: 7.1
% N: 2.45 (calculated 2.21)

Titanium dioxide R was coated with 1% of this N-methyl-diethanolamine-di-oleic acid ester in accordance with the method given in Example 1. The coated pigment was tested in accordance with the procedure given in Example 1. The tinted lacquer produced thereby had a reflectance value of 30.0 at 420 nm, compared with 29.0 in the case of an identical lacquer containing non-coated titanium dioxide.

EXAMPLE 8

A quantity of 0.5 percent by weight of the triethanolamine-tri-2-ethylhexanoic acid ester described in Example 2 was coated on an iron oxide yellow pigment (commercial product of the firm Bayer; "Type 920") in the manner described in Example 1. The dispersibility of the treated and non-treatment pigment in an aqueous medium was tested in the following manner:

100 gm of an aqueous 1 percent by weight hydroxyethyl cellulose (commercial product Natrasol 250 HR of the firm Hercules) were weighed into a 250 ml beaker (diameter: 6 cm; height: 11 cm). 50 gm of the pigment was added and was stirred in manually by means of a glass rod. Dispersion was effected by means of an agitator whose shaft was provided with a toothed disc with a 4 cm diameter. The agitating disc was immersed centrally into the pigment paste to the point where the disc was at a distance of 1 cm from the bottom of the beaker. Agitation was subsequently effected for 5 minutes at 1000 rpm. 30 gm of an aqueous plastics material dispersion (53 percent by weight dispersion of a vinyl acetate-acrylic acid copolymer; commercial product Mowilith DM 5 by the firm Hoechst) and 3 drops of anti-foaming agent (commercial product Dehydran of the firm Henkel) were then added. These additives were agitated manually.

Samples of the pigment dispersions were drawn out on a glass plate by means of a drawing box having a gap height of 200 μm and width of 6 cm. The dried films were assessed visually according to value stages 0 to 5, wherein 0 signifies no visible pigment agglomerates (dots), and 5 signifies a large number of visible pigment agglomerates.

The pigment coated with triethanolamine-tri-2-ethylhexanoic acid ester resulted in the value 2, and the non-treated pigment resulted in the value 5.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. In a process for treating titanium dioxide pigments and iron oxide pigments with a dispersing agent in order to improve their dispersibility in organic and aqueous media, the improvement comprising utilizing at least one ester of at least two moles of an aliphatic carboxylic acid having 6 to 18 carbon atoms in the molecule and selected from the group consisting of alkanoic acids, alkenoic acids, hydroxy substituted alkanoic acids and hydroxy substituted alkenoic acids with a mole of a tertiary alkylolamine selected from the group consisting of triethanolamine and an N-methyl-diethanolamine as the dispersing agent.

2. The process of claim 1, wherein the ester is fully esterified.

3. The process of claim 1, wherein the ester is used in an amount of from 0.05 to 4 percent by weight, relative to the weight of the pigment to be treated.

4. The process of claim 3, wherein the ester is used in an amount of from 0.1 to 1.0 percent by weight, relative to the weight of the pigment to be treated.

5. The process of claim 1, wherein the pigment to be treated is titanium dioxide.

6. The process of claim 1, wherein the ester is partially esterified.

7. The process of claim 1, wherein the ester is a member selected from the group consisting of triethanolamine tricaproic acid ester, triethanolamine tri-2-ethylhexanoic acid ester, triethanolamine-trisoya oil fatty acid ester, triethanolamine-tri-12-hydroxy stearic acid ester, triethanolamine-di-caproic acid ester, and N-methyl-diethanolamine-di-oleic acid ester.

8. Iron oxide treated by the process of claim 1.

9. Titanium dioxide treated by the process of claim 1.

10. The process of claim 1 wherein tertiary alkylolamine is triethanolamine.

* * * * *

UNITED STATES PATENT AND TRADEMARK OFFICE
CERTIFICATE OF CORRECTION

PATENT NO. : 4,165,239
DATED : August 21, 1979
INVENTOR(S) : HEINRICH LINDEN et al.

It is certified that error appears in the above-identified patent and that said Letters Patent are hereby corrected as shown below:

Column 3, line 40     "diatromaceous" should read -- diatomaceous --.

Column 5, line 1      "(a) and (d)" should read -- (a) to (d) --.

Column 10, line 35    "wherein" should read -- wherein the --.

Signed and Sealed this

Eleventh Day of March 1980

[SEAL]

Attest:

SIDNEY A. DIAMOND

Attesting Officer

Commissioner of Patents and Trademarks